US007644047B2

(12) United States Patent  (10) Patent No.: US 7,644,047 B2
Assadian et al.  (45) Date of Patent: Jan. 5, 2010

(54) SEMANTIC SIMILARITY BASED DOCUMENT RETRIEVAL

(75) Inventors: Behrad Assadian, Ipswich (GB); Behnam Azvine, Ipswich (GB); Trevor P Martin, Cam (GB)

(73) Assignee: British Telecommunications public limited company, London (GB)

( * ) Notice: Subject to any disclaimer, the term of this patent is extended or adjusted under 35 U.S.C. 154(b) by 103 days.

(21) Appl. No.: 10/573,152

(22) PCT Filed: Sep. 22, 2004

(86) PCT No.: PCT/GB2004/004028

§ 371 (c)(1),
(2), (4) Date: Mar. 23, 2006

(87) PCT Pub. No.: WO2005/041063

PCT Pub. Date: May 6, 2005

(65) Prior Publication Data

US 2007/0016571 A1   Jan. 18, 2007

(30) Foreign Application Priority Data

Sep. 30, 2003 (GB) ................................. 0322899.6
Dec. 12, 2003 (GB) ................................. 0328890.9

(51) Int. Cl.
*G06F 15/18* (2006.01)
*G06F 7/00* (2006.01)
(52) U.S. Cl. ...................... 706/1; 706/20; 704/9; 707/5; 707/6
(58) Field of Classification Search ...................... 706/1; 707/5, 6; 704/9
See application file for complete search history.

(56) References Cited

U.S. PATENT DOCUMENTS

2002/0042793 A1 *   4/2002   Choi ............................. 707/6
2002/0059220 A1 *   5/2002   Little ........................... 707/5
2003/0033288 A1    2/2003   Shanahan et al.

FOREIGN PATENT DOCUMENTS

WO   WO 03/052635 A1   6/2003

OTHER PUBLICATIONS

Nikravesh et al, "Fuzzy Queries, Search, and Decision Support System", Soft Computing, vol. 6, No. 5, Aug. 2002, pp. 373-399, XP002313090, Heidelberg.
Nikravesh et al., "Fuzzy Logic and the Internet (FLINT): Internet, World Wide Web, and Search Engines", Soft Computing, vol. 6, No. 5, Aug. 2002, pp. 287-299.
Baez-Yates et al., "Modern Information Retrieval, Chapter 2: Modeling", Modern Information Retrieval, Harlow; Addison Wesley, GB, 1999, page COMPLETE58, XP002299413.
International Search Report dated Jan. 12, 2005.

* cited by examiner

*Primary Examiner*—David R Vincent
*Assistant Examiner*—Kalpana Bharadwaj
(74) *Attorney, Agent, or Firm*—Nixon & Vanderhye P.C.

(57) ABSTRACT

A method and apparatus are provided for generating, from an input set of documents, a word replaceability matrix defining semantic similarity between words occurring in the input document set. For each word, distinct word sequences of predetermined length are identified from the documents of the set, each word sequence being indicative of the context in which the word was used and, according to the relative frequency of occurrence of the identified word sequences for the word, fuzzy sets are generated for each word comprising membership values for corresponding groups of word sequences. For each pair of words occurring in the document set, their respective fuzzy sets are used to calculate the probability that the first word of a pair is semantically suitable as a replacement for the second word of the pair, these probabilities being collated to form a word similarity matrix for use in an improved method of determining document similarity and in information retrieval.

10 Claims, 2 Drawing Sheets

SEMANTIC SIMILARITY BASED DOCUMENT RETRIEVAL

This application is the US national phase of international application PCT/GB2004/004028 filed 22 Sep. 2004 which designated the U.S. and claims benefit of GB 0322899.6 and GB 0328890.9, dated 30 Sep. 2003 and 12 Dec. 2003, respectively, the entire content of which is hereby incorporated by reference.

This invention relates to information retrieval and in particular to a method and apparatus for determining similarity of words and information content of documents as an aid to information retrieval.

There are a number of known techniques by which semantic similarity of documents may be determined. In one such technique, a document is represented by a vector, each value in the vector being a measure of the incidence of a corresponding word or term in the document. A measure of semantic similarity between two such documents may then be calculated as the scalar product, also known as the dot product, of the corresponding document vectors. Such a measure of document similarity forms the basis of a known document clustering technique whereby documents having semantically similar content may be assembled into groups of documents apparently relating to similar subject matter. However, by this technique, the measure of semantic similarity between two documents is based only upon those words or terms that occur in both documents. That is, document vectors must relate to the same set of words or terms. One problem with this technique is that when two documents describe the same topic but use slightly different terminology, the technique would fail to recognise the semantic similarity.

Referring to earlier patent documents, U.S. Pat. No. 6,246,977 and U.S. Pat. No. 6,161,084 (both "Messerly et al") relate to performing information retrieval utilising semantic representations of text. According to these documents, information retrieval may be performed using a "tokeniser" that parses input text to identify logical forms, then expands the logical forms using hypernyms.

According to a first aspect of the present invention there is provided a method for determining the semantic similarity of words in a plurality of words selected from a set of one or more documents, for use in the retrieval of information in an information system, comprising the steps of:
(i) for each word of said plurality of words:
(a) identifying, in documents of said set of one or more documents, word sequences comprising the word and a predetermined number of other words;
(b) calculating a relative frequency of occurrence for each distinct word sequence among word sequences containing the word; and
(c) generating a fuzzy set comprising, for groups of word sequences containing the word, corresponding fuzzy membership values calculated from the relative frequencies determined at step (b); and
(ii) calculating and storing, for each pair of words of said plurality of words, using respective fuzzy sets generated at step (i), a probability that the first word of the pair is semantically suitable as a replacement for the second word of the pair.

Preferably, the method comprises the further step of:
(iii) adding a new document to said set of documents and, using a set of words selected from said new document, performing an incremental update to said stored probabilities by means of steps (i) and (ii) performed in respect of said selected words using word sequences identified in said new document.

According to a second aspect of the present invention, there is provided an information retrieval apparatus for use in retrieving information from a set of one or more documents, comprising:
an input for receiving a search query;
generating means for generating a set of probabilities indicative of the semantic similarity of words selected from said set of one or more documents;
query enhancement means for modifying a received search query with reference, in use, to said generated set of probabilities; and
information retrieval means for searching said set of one or more documents for relevant information using a received search query modified by said query enhancement means,
wherein said generating means are arranged, in use:
(i) for each word selected from said set of one or more documents:
(a) to identify, in documents of said set of one or more documents, word sequences comprising the word and a predetermined number of other words;
(b) to calculate a relative frequency of occurrence for each distinct word sequence among word sequences containing the word; and
(c) to generate a fuzzy set comprising, for groups of word sequences containing the word, corresponding fuzzy membership values calculated from the relative frequencies determined at step (b); and
(ii) to calculate, for each pair of words of said plurality of words, using respective fuzzy sets generated at step (i), a probability that the first word of the pair is semantically suitable as a replacement for the second word of the pair.

In a further preferred embodiment, the information retrieval apparatus further comprises updating means for adding a new document to said set of one or more documents and, using a set of words selected from said new document and word sequences identified in said new document, performing an incremental update to said generated set of probabilities in respect of words in said set of words.

According to a third aspect of the present invention, there is provided an information retrieval apparatus for use in retrieving information in an information system, comprising:
an input for receiving a search query;
generating means for generating a set of probabilities indicative of the semantic similarity of words selected from a sample set of one or more documents;
query enhancement means for modifying a received search query with reference, in use, to said generated set of probabilities; and
information retrieval means for searching said information set for relevant information using a received search query modified by said query enhancement means,
wherein said generating means are arranged, in use:
(i) for each word selected from said sample set:
(a) to identify, in documents of said sample set, word sequences comprising the word and a predetermined number of other words;
(b) to calculate a relative frequency of occurrence for each distinct word sequence among word sequences containing the word; and
(c) to generate a fuzzy set comprising, for groups of word sequences containing the word, corresponding fuzzy membership values calculated from the relative frequencies determined at step (b); and
(ii) to calculate, for each pair of words of said plurality of words, using respective fuzzy sets generated at step (i), a probability that the first word of the pair is semantically suitable as a replacement for the second word of the pair.

An apparatus according to this third aspect of the present invention is arranged to make use of a sample set of one or more documents as a source of words and associated measures of semantic similarity.

According to a fourth aspect of the present invention there is provided an information processing apparatus, for use in an information system, for identifying information sets associated with a predetermined information category, the apparatus comprising:

generating means for generating, in the form of a matrix, a set of probabilities indicative of the semantic similarity of words selected from a sample set of one or more documents representative of the predetermined information category;

calculating means arranged to calculate, for each information set, a vector of values representing the relative frequency of occurrence, in the information set, of words represented in a matrix generated by the generating means; and clustering means arranged to determine a measure of mutual similarity between pairs of information sets, using the respectively calculated vectors and the generated matrix, and to use the determined measures in a clustering algorithm to select one or more information sets to associate with the predetermined information category, wherein said generating means are arranged, in use:
(i) for each word selected from said sample set:
 (a) to identify, in documents of said sample set, word sequences comprising the word and a predetermined number of other words;
 (b) to calculate a relative frequency of occurrence for each distinct word sequence among word sequences containing the word; and
 (c) to generate a fuzzy set comprising, for groups of word sequences containing the word, corresponding fuzzy membership values calculated from the relative frequencies determined at step (b); and
(ii) to calculate, for each pair of words of said plurality of words, using respective fuzzy sets generated at step (i), a probability that the first word of the pair is semantically suitable as a replacement for the second word of the pair.

Preferred embodiments of the present invention will now be described in more detail and with reference to the accompanying drawings, of which:

An overview of a preferred process according to embodiments of the present invention will firstly be described with reference to FIG. 1.

Figure 1:
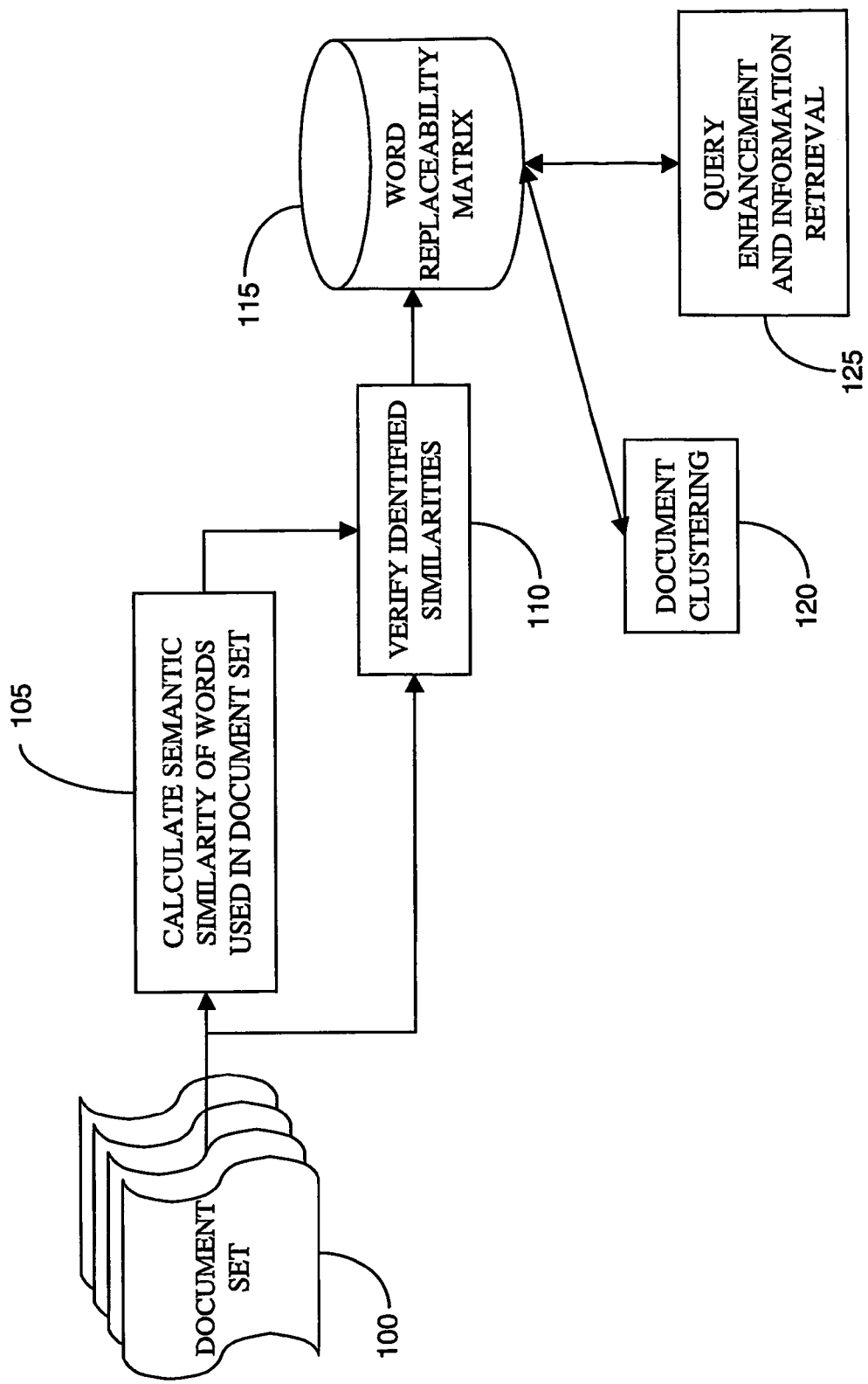
FIG. 1 is an overview of a process according to preferred embodiments of the present invention.

Referring to FIG. 1, a diagram is shown representing, in overview, a process for analysing a document set 100 in order to generate a word replaceability matrix 115. The contents of the document set 100 are analysed 105 to calculate a measure of the semantic similarity of words used in the document set. The determined similarities are checked in a verification process 110 and the calculated values of the measure are stored as a word replaceability matrix 115, each value being indicative of the degree of semantic similarity between a respective pair of words and hence the probability that the first word of the pair is suitable for use in place of the second word. The matrix 115 may be exploited in a number of ways of which two are shown in FIG. 1: to cluster 120 documents in the document set 100 into distinct information categories; and enhancement 125 of search queries for use in information retrieval in the document set 100 or in other document sets. Both applications will be discussed in more detail below.

In a preferred embodiment of the present invention to be described below, a particular technique is used to calculate the semantic similarity of words used in the input document set 100. The technique is based upon identification of so-called "n-grams" of words occurring in the document set 100, where an n-gram is any sequence of n consecutive words occurring in a document. For example the sequence of words "the cat is blue" is a 4-gram of words. The main purpose of identifying n-grams in the present invention is to understand and to represent the context in which particular words are used in a document. The value of n is determined at the outset, and the inventors in the present case have found that a value n=3 or n=4 gives good results, although other values may also be selected. However, use of significantly higher values of n does not appear to improve the performance of the technique. For each word, a fuzzy set of corresponding n-grams is formed based upon the observed probabilities of each n-gram occurring in the document set 100. The technique of semantic unification, described for example in a paper by J. F. Baldwin, J. Lawry, and T. P. Martin: "Efficient Algorithms for Semantic Unification", in *Proc. Information Processing and the Management of Uncertainty*, 1996, Spain, is then used calculate the semantic similarity of words from their respective fuzzy sets and hence to determine the probability that one word would be a suitable replacement for another. The calculated probabilities and the respective word pairs are collated into a table to form a so-called "Word Replaceability Matrix" 115. Preferably, a predetermined threshold is applied so that only those probabilities that exceed the threshold, and hence only the strongest respective word similarities, are recorded in the matrix 115.

A preferred process 105 for calculating the semantic similarity of words occurring in the document set 100 and hence for generating a word replaceability matrix 115 will now be described in detail with reference to FIG. 2, according to a preferred embodiment of the present invention.

Figure 2:
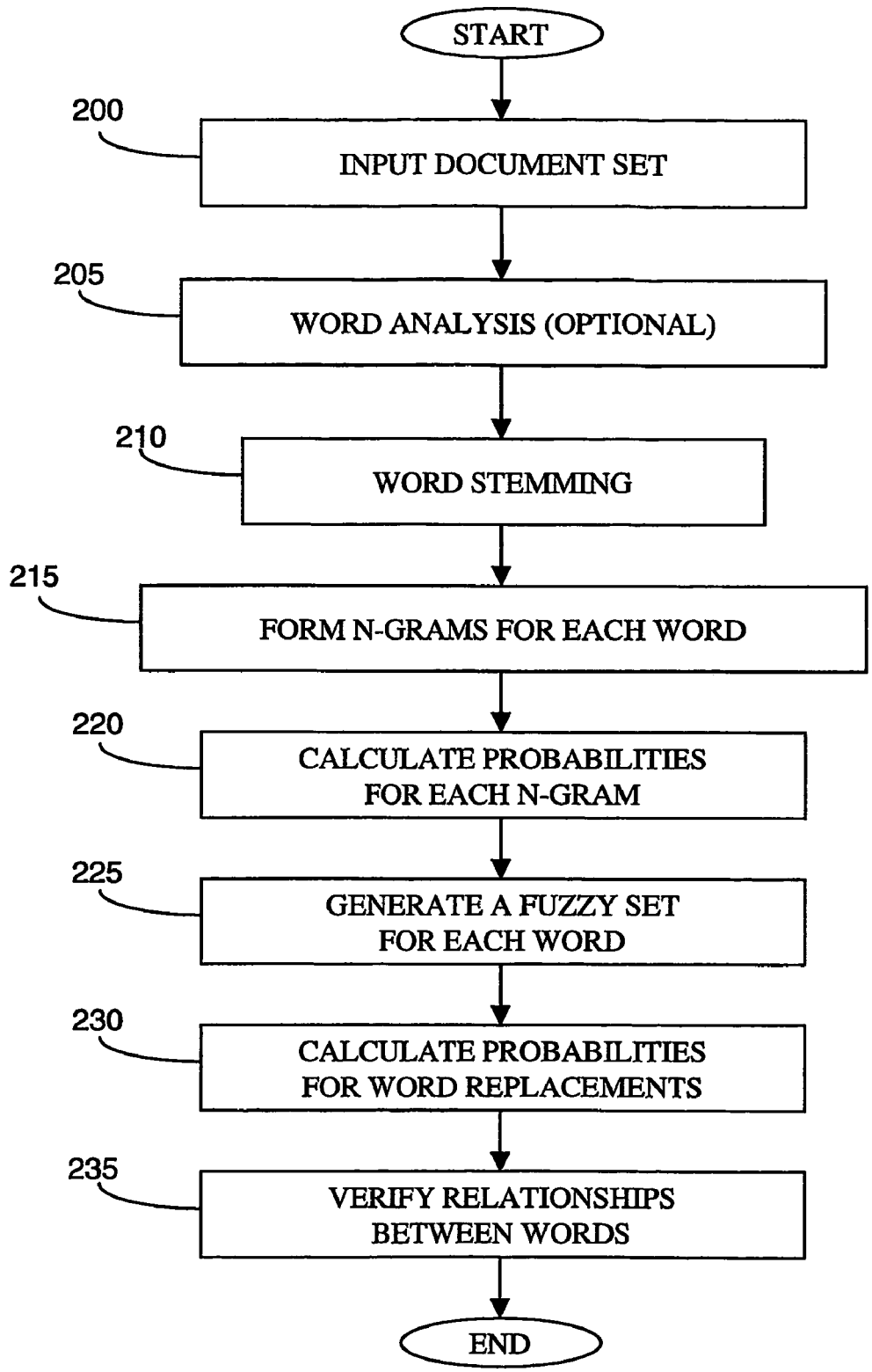
FIG. 2 is a flow chart showing steps in a process for generating a word replaceability matrix according to a preferred embodiment of the present invention.

Referring to FIG. 2, the process begins, and at STEP 200 a document set 100 is input, the set comprising a number of documents containing readable text, for example documents in ASCII plain text format, or XML files. At STEP 205 some initial, optional, word analysis may be carried out by way of an initial filtering step to eliminate certain types of word from consideration in the remaining steps in this process and hence to select a first set of words as candidates for representation in a resultant Word Replaceability Matrix 115. STEP 205 is considered to be optional because it is not essential to the working of the present invention to limit the choice of words represented in the resultant word replaceability matrix 115. However, there are certain advantages to eliminating certain types of word from the remaining steps in this process, not least in savings in processing required to generate the matrix 115. Certain types of "low value" word are unlikely to be useful in a resultant matrix 115, words such as "a", "the", "and", "or". In addition, the inventors have found that there is little advantage to including other words that occur either very frequently or very infrequently in the input document set 100. Thus, processing at STEP 205 may include an analysis of the frequency of occurrence of each word in the input document set 100 and the elimination from further consideration of those words having a frequency of occurrence lying in the first and fourth quartiles of the observed frequency distribution. However, this latter step may be omitted in particular when carrying out incremental updates to the matrix 115, triggered by the input of a further document for example.

At STEP 210 those words remaining after STEP 205 may be processed in a word stemming algorithm, a suitable stemming algorithm being the Porter Stemmer algorithm, as described in M. F. Porter: An Algorithm for Suffix Stripping, Automated Library and Information Systems, Vol. 14, No. 3, pp. 130-137, 1980.

At STEP 215, for each word output from STEP 210, the input documents 100 are analysed to identify the n-grams of surrounding words, each n-gram being representative of a context in which the word is being used. The value of n is predetermined and a value of 3 or 4 has been found by the inventors in the present case to give satisfactory results. Preferably, in identifying the n-grams, characters such as punctuation marks, brackets, inverted commas, hyphens and underscores are ignored, and n-grams are not selected where they overlap sentence boundaries. Formally, the following natural language procedure is followed to identify n-grams in a document:

DOC=START WORDS? END

WORDS=WORD|WORD SPACE*WORD

WORD=(any char not {' '})*

START=(start of file)

END=(end of file)

SPACE=white space or ,.:;-

Ignore characters '"(){ }[ ]

Also ignore n-grams that would contain a "." at a position other than at the end Consider, by way of example, the following four sentences, found in an input document set to contain the word brown:

The quick brown fox jumps over the lazy dog.

The quick brown cat jumps onto the active dog.

The slow brown fox jumps onto the quick brown cat.

The quick brown cat leaps over the quick brown fox.

Assuming that a value of n=3 has been chosen for this operation of the process, then the word brown occurs in three distinct contexts represented by the 3-grams formally denoted by brown: (quick,fox)

brown: (quick,cat)

brown: (slow,fox)

At STEP 220, for each word, the relative frequency of occurrence of each corresponding n-gram is calculated. That is, for each word, the frequency of occurrence of each distinct and corresponding n-gram is divided by the total number of n-grams containing the word to give, for each distinct n-gram, a measure of the probability that the word appears in the document set 100 in the context represented by that distinct and corresponding n-gram. To illustrate this, continuing with the example from STEP 215, the word brown occurs in a total of six 3-grams, represented by three distinct 3 grams having a frequency of occurrence shown in the following table:

| brown total = 6 | | |
|---|---|---|
| quick | fox | 2 |
| quick | cat | 3 |
| slow | fox | 1 |

From this, the respective probabilities can be calculated to give the following probability distribution for the contexts of brown, in order of decreasing probability:

$Pr\{(quick, cat)\}=\frac{1}{2}$ $Pr\{(quick, fox)\}=\frac{1}{3}$ $Pr\{(slow, fox)\}=\frac{1}{6}$ At STEP 225, the probability values calculated at STEP 220 are used to generate a fuzzy set for each word. That is, for each distinct n-gram, or context of a word, the corresponding probability values are used to calculate fuzzy membership values for the word. Preferably, in calculating these fuzzy membership values, the underlying principle of "least prejudiced distribution" of probability mass is applied, meaning that in the absence of any bias towards one or other element in a group of n-grams, the probability mass assigned to the group is distributed equally amongst the composite n-grams. The principles of fuzzy membership values and probability mass assignment are described for example in J. F. Baldwin (1992) in "The Management of Fuzzy and Probabilistic Uncertainties for Knowledge-based Systems.", the *Encyclopedia of AI*, edited by S. A. Shapiro, published by John Wiley ($2^{nd}$ edition), pages 528-537.

This step in the process may be illustrated by a continuation of the example from STEP 220. Starting with the probabilities calculated at STEP 220 of the word brown arising in the document set in each of the 3-gram contexts as follows:

$Pr\{(quick, cat)\}=\frac{1}{2}$ $Pr\{(quick, fox)\}=\frac{1}{3}$ $Pr\{(slow, fox)\}=\frac{1}{6}$ and representing the corresponding fuzzy membership values to be determined as x, y and z respectively, then the assignment of probability mass across the possible contexts for the word brown would be represented by $\{(quick,cat)\}:x-y, \{(quick,cat),(quick fox)\}:y-z,$
$\{(quick,cat),(quick fox), (slow,fox)\}:z$ In the absence of any bias in favour of one context over another, the probability masses y-z and z are assumed to be distributed evenly over the contexts in their respective groups. This distribution is therefore referred to as the least prejudiced distribution of the probability mass. While other distributions of the probability masses y-z and z are possible in general, no other distributions are considered in the present patent application.

On the assumption of a least prejudiced distribution of the probability mass, the fuzzy membership values for each context would therefore be required to satisfy the following equations, relating the fuzzy membership values to the calculated probabilities above:

$(quick,fox):x-y+(y-z)/2+z/3=\frac{1}{2}$ $(quick,cat):(y-z)/2+z/3=\frac{1}{3}$ $(slow,fox):z/3=\frac{1}{6}$ Solving these three simultaneous equations for x, y and z gives fuzzy membership values of $x=1$, $y=\frac{5}{6}$ and $z=\frac{1}{2}$. Therefore the fuzzy set for the word brown is $\{(quick,cat):1, (quick,fox):0.833, (slow,fox):0.5\}$ By this technique, fuzzy sets are generated for each of the words output from STEP 210 for which contexts (n-grams) were identified at STEP 215.

At STEP 230, for each pair of words, the corresponding fuzzy sets are used to calculate the probability that one word of the pair may be a semantically suitable word to use in place of the other word of the pair. These probabilities will ultimately be the basis of the Word Replaceability Matrix 115. The technique of point semantic unification is applied to calculate these probabilities from the membership values in the respective word fuzzy sets. However, to illustrate the principle, the example will be continued from STEP 225.

For the word brown, the following fuzzy set was generated at STEP 225:

{(quick,cat):1, (quick,fox):0.833, (slow,fox):0.5}

The mass assignment for the word brown is therefore $m$(brown)={(quick,cat)}:⅙, {(quick,cat),(quick,fox)}: ⅓, {(quick,cat),(quick,fox), (slow,fox)}:½

Suppose that for another word, black, the following fuzzy set was generated at STEP 225:

{(quick,cat):1, (slow, fox):0.75}

The mass assignment for the word black is therefore $m$(black)={(quick,cat)}:¼, {(quick,cat),(slow,fox)}:¾

The degree of support for the word black being a semantically suitable replacement given the word brown may be represented in table form as follows, where the mass assignments for the given word brown are arranged across the columns of the table and those for the potential replacement word black being arranged as the rows:

|  | {(quick, cat)}: ⅙ | {(quick, cat), (quick, fox)}: ⅓ | {(quick, cat), (quick, fox), (slow, fox)}: ½ |
|---|---|---|---|
| {(quick, cat)}: ¼ | ¼ × ⅙ | ½ × ¼ × ⅓ | ⅓ × ¼ × ½ |
| {(quick, cat), (slow, fox)}: ¾ | ¾ × ⅙ | ½ × ¾ × ⅓ | ⅔ × ¾ × ½ |

The probability of the word black being a suitable replacement for the word brown is the sum of the values in the table, giving a conditional probability Pr(black|brown)=0.625. Similarly, the probability of the word brown being a suitable replacement for the word black may be calculated using a corresponding table as the conditional probability Pr(brown|black)=0.8125.

By performing these calculations for each pair of words for which fuzzy sets were generated at STEP 225, a table of conditional probabilities is generated. Preferably, a predetermined threshold is applied so that only those conditional probabilities that exceed the threshold, and hence only the strongest respective word similarities, are preserved in the table, all other probabilities being set to zero.

At STEP 235, a verification step (110) may be performed to automatically or semi-automatically eliminate any of the more unlikely relationships identified between words under this process 105. In a preferred method, a lexical database such as Wordnet™, accessible over the Internet at http://www.cogsci.princeton.edu/~wn/, may be used in a procedure to check the semantic relationships identified and, if necessary, to modify corresponding probability values in the table generated at STEP 225, setting them to zero for example where a relationship is apparently invalid. For example, a process may be executed whereby each word in the table is submitted in turn to Wordnet and a corresponding list of synonyms, hyponyms, hypernyms and antonyms is returned. For each word in the generated table having a calculated conditional probability in excess of a predetermined threshold, a comparison is made with the semantic relationship suggested by the list returned by Wordnet. If there is no apparent semantic relationship suggested by Wordnet, or if the meanings of the words are clearly opposite, then the replaceability suggested by the calculated value of conditional probability in the table is likely to be false and the value may be overwritten with a zero. Where the result of the comparison is not clear-cut, a manual verification may be carried out, achieved preferably by presenting to a user, as background to the apparent relationship between the words, the respectively generated fuzzy sets.

The table resulting from verification STEP 235 (110) is the Word Replaceability Matrix 115.

Once the matrix 115 has been generated it may be exploited in a number of ways. For example, the word replaceability matrix 115 may be used in an enhancement to the known vector dot product technique for assessing semantic similarity of documents, described above in the introductory part of the present patent specification. A weakness of that known vector dot product technique is that related documents that use different terminology are not identified as being semantically related. The enhancement made possible by the word replaceability matrix 115 of the present invention allows the measure of similarity to be based upon words that are not necessarily the same between documents but which are nevertheless semantically similar to some degree.

In the known vector dot product technique, if a first document is represented by a document vector $\underline{v}_1=(v_{11}, v_{12}, \ldots, v_{1k})$ and a second document is represented by a document vector $\underline{v}_2=(v_{21}, v_{22}, \ldots, v_{2k})$, where the values $v_{ij}$ are indicative of the incidence of a j-th word of a common set of k words in the document i, then the dot product $$\underline{v}_1 \cdot \underline{v}_2 = \sum_i v_{1i} v_{2i}$$

provides a value indicative of the semantic similarity between the documents. However, by using the probability values in the word replaceability matrix 115, this known measure of semantic similarity may be enhanced so that not only are identical words considered in the calculation of document similarity, but also other words represented in the word replaceability matrix 115 that may be semantically related.

Assuming that the word replaceability matrix 115 contains m words, so that the matrix 115 is an m×m matrix of probability values, then for an i-th document, a 1×m matrix of values $u_{ij}$ may be formed where the j-th value is indicative of the frequency of occurrence, in the i-th document, of the j-th word in the matrix 115. If a particular word of the matrix does not occur in the document, then a value of zero appears in the corresponding position in the 1×m matrix for that document. The values $u_{ij}$ in the 1×m matrix are normalised so that a document containing an unusually high proportion of the words represented in the matrix does not skew the calculation that follows.

The semantic similarity $S_{12}$ between a first document, represented by a 1×m matrix $\underline{u}_1=(u_{11} \; u_{12} \ldots u_{1m})$ and a second document, represented by a 1×m matrix $\underline{u}_2=(u_{21} \; u_{22} \ldots u_{2m})$, is calculated, by this enhanced measure, according to the following multiplication of matrices $$S_{12} = \sum_j \sum_i w_{ji} u_{1i} u_{2j}$$

where $w_{ij}$ is the probability, read from the matrix 115, that the j-th word represented in the matrix 115 is semantically suitable as a replacement for the i-th word of the matrix 115.

Using this enhanced measure of semantic similarity between documents, for example those in document set 100, documents may be clustered (120) into groups of documents having related information content. Preferably a known clustering algorithm may be used to cluster documents according to their related information content, for example an algorithm as described in "Hierarchic Agglomerative Clustering Methods for Automatic Document Classification" by Griffiths A et al in the Journal of Documentation, 40:3, September 1984, pp 175-205. In such a process, each document is initially placed in a cluster by itself and the two most similar such clusters are then combined into a larger cluster, for which similarities with each of the other clusters must then be computed. This combination process is continued until only a single cluster of documents remains at the highest level.

Of course, the matrix 115 may be used as a semantic dictionary both in relation to documents of the document set 100 on which it was based, or in relation to other documents. However, a particular advantage of the process 105, 110 described above with reference to FIG. 2 is that the matrix 115 may be incrementally updated as new documents, and hence new words, are considered. In particular, on adding a new document, processing steps 205 to 235 of FIG. 2, as described above, may be performed on the basis of a set of words, optionally selected from the new document at STEP 205, by generating fuzzy sets for words not already represented in the matrix 115 and by updating the fuzzy sets for those words of the new document that are represented in the matrix 115. The fuzzy sets for the new words are generated at STEP 225 entirely on the basis of n-grams identified at STEP 215 in the new document. The fuzzy membership values in the fuzzy sets for those selected words already represented in the matrix 115 are updated, at STEP 225, having included any new distinct n-grams identified at STEP 215 from the new document and having updated the probabilities, at STEP 220, both for the existing n-grams and for the new n-grams. Corresponding entries in the matrix 115 are then recalculated at STEP 230 in respect of the updated words and the matrix is extended as necessary with any new words selected from the new document.

As mentioned above with reference to FIG. 1, besides application to an improved document clustering technique (120), the word replaceability matrix 115 may be used to extend or modify terms in a user's search query for use in an information retrieval system. In particular, a set of words entered by a user may be extended with semantically similar words identified with reference to the matrix 115 in order to improve the chances of a search engine returning a more complete set of relevant documents. This is likely to be particularly effective when searching for information contained in the document set on which the matrix 115 was based, although as more documents are considered and as the matrix 115 is incrementally updated, the more broadly-based semantic relationships and the increased number of words represented in the matrix 115 make it increasingly useful as a semantic dictionary for improving the information retrieval performance of search engines with respect to other information sets.

The invention claimed is:

1. A computerized method for determining the semantic similarity of words in a plurality of words selected from a set of one or more documents, for use in the retrieval of information in an information system, comprising the steps of:
   (i) for each word of said plurality of words:
       (a) identifying, in documents of said set of one or more documents, word sequences comprising the word and a predetermined number of other words;
       (b) calculating a relative frequency of occurrence for each distinct word sequence among word sequences containing the word; and
       (c) generating a fuzzy set comprising, for word sequences containing the word, corresponding fuzzy membership values calculated from the relative frequencies determined at step (b); and
   (ii) calculating and storing, for each pair of words of said plurality of words, using respective fuzzy sets generated at step (i), a probability that the first word of the pair is semantically suitable as a replacement for the second word of the pair.

2. A method according to claim 1, further comprising the step of:
   (iii) adding a new document to said set of one or more documents and, using a set of words selected from said new document, performing an incremental update to said stored probabilities by means of steps (i) and (ii) performed in respect of said selected words using word sequences identified in said new document.

3. An information retrieval apparatus for use in retrieving information from a set of one or more documents, comprising:
   an input for receiving a search query;
   generating means for generating a set of probabilities indicative of the semantic similarity of words selected from said set of one or more documents;
   query enhancement means for modifying a received search query with reference, in use, to said generated set of probabilities; and
   information retrieval means for searching said set of one or more documents for relevant information using a received search query modified by said query enhancement means,
   wherein said generating means are arranged, in use:
   (i) for each word selected from said set of one or more documents:
       (a) to identify, in documents of said set of one or more documents, word sequences comprising the word and a predetermined number of other words;
       (b) to calculate a relative frequency of occurrence for each distinct word sequence among word sequences containing the word; and
       (c) to generate a fuzzy set comprising, for groups of word sequences containing the word, corresponding fuzzy membership values calculated from the relative frequencies determined at step (b); and
   (ii) to calculate, for each pair of words of said plurality of words, using respective fuzzy sets generated at step (i), a probability that the first word of the pair is semantically suitable as a replacement for the second word of the pair.

4. An information retrieval apparatus according to claim 3, wherein said query enhancement means are arranged to identify, with reference to said generated set of probabilities, a word having a similar meaning to a term of said received search query and to modify said search query using said identified word.

5. An information retrieval apparatus according to claim 3, further comprising updating means for adding a new document to said set of one or more documents and, using a set of words selected from said new document and word sequences identified in said new document, performing an incremental update to said generated set of probabilities in respect of words in said set of words.

6. An information retrieval apparatus for use in retrieving information in an information system, comprising:
   an input for receiving a search query;
   generating means for generating a set of probabilities indicative of the semantic similarity of words selected from a sample set of one or more documents;
   query enhancement means for modifying a received search query with reference, in use, to said generated set of probabilities; and
   information retrieval means for searching said information set for relevant information using a received search query modified by said query enhancement means,
   wherein said generating means are arranged, in use:
   (i) for each word selected from said sample set:
      (a) to identify, in documents of said sample set, word sequences comprising the word and a predetermined number of other words;
      (b) to calculate a relative frequency of occurrence for each distinct word sequence among word sequences containing the word; and
      (c) to generate a fuzzy set comprising, for groups of word sequences containing the word, corresponding fuzzy membership values calculated from the relative frequencies determined at step (b); and
   (ii) to calculate, for each pair of words of said plurality of words, using respective fuzzy sets generated at step (i), a probability that the first word of the pair is semantically suitable as a replacement for the second word of the pair.

7. An information retrieval apparatus according to claim 6, further comprising updating means for adding a new document to said sample set of one or more documents and, using a set of words selected from said new document and word sequences identified in said new document, performing an incremental update to said generated set of probabilities in respect of words in said set of words.

8. An information processing apparatus for use in an information processing apparatus, for use in an information system, for identifying information sets associated with a predetermined information category, the apparatus comprising:
   generating means for generating, in the form of a matrix, a set of probabilities indicative of the semantic similarity of words selected from a sample set of one or more documents representative of the predetermined information category;
   calculating means arranged to calculate, for each information set, a vector of values representing the relative frequency of occurrence, in the information set, of words represented in a matrix generated by the generating means; and
   clustering means arranged to determine a measure of mutual similarity between pairs of information sets, using the respectively calculated vectors and the generated matrix, and to use the determined measures in a clustering algorithm to select one or more information sets to associate with the predetermined information category,
   wherein said generating means are arranged, in use:
   (i) for each word selected from said sample set:
      (a) to identify, in documents of said sample set, word sequences comprising the word and a predetermined number of other words;
      (b) to calculate a relative frequency of occurrence for each distinct word sequence among word sequences containing the word; and
      (c) to generate a fuzzy set comprising, for groups of word sequences containing the word, corresponding fuzzy membership values calculated from the relative frequencies determined at step (b); and
   (ii) to calculate, for each pair of words of said plurality of words, using respective fuzzy sets generated at step (i), a probability that the first word of the pair is semantically suitable as a replacement for the second word of the pair.

9. An information processing apparatus according to claim 8, wherein the clustering algorithm is a hierarchic agglomerative clustering algorithm.

10. A computerized method for determining the semantic similarity of words in a plurality of words selected from a set of one or more documents, for use in the retrieval of information in an information system, comprising the steps of:
   (i) for each word of said plurality of words:
      (a) identifying, in documents of said set of one or more documents, word sequences comprising the word and a predetermined number of other words;
      (b) calculating a relative frequency of occurrence for each distinct word sequence among word sequences containing the word; and
      (c) generating, from the relative frequencies determined at step (b), a set of probabilities representative of the contexts in which the word occurs; and
   (ii) calculating and storing, for each pair of words of said plurality of words, using respective probability sets generated at step (i), a probability that the first word of the pair is semantically suitable as a replacement for the second word of the pair.

* * * * *